United States Patent [19]

Kemmesies

[11] 4,438,407
[45] Mar. 20, 1984

[54] INTEGRABLE DEMODULATOR FOR DIGITAL SIGNALS MODULATED ONTO CARRIERS

[75] Inventor: Hartmut Kemmesies, Puchheim-Bhf, Fed. Rep. of Germany

[73] Assignee: Siemens Aktiengesellschaft, Berlin and Munich, Fed. Rep. of Germany

[21] Appl. No.: 19,136

[22] Filed: Mar. 9, 1979

[30] Foreign Application Priority Data

Mar. 16, 1978 [DE] Fed. Rep. of Germany ....... 2811488

[51] Int. Cl.³ .................. H03D 3/18; H03K 9/00; H03K 13/00
[52] U.S. Cl. ............................ 329/50; 329/102; 329/105; 375/94
[58] Field of Search ............. 329/50, 102, 104, 105; 375/94, 23, 25, 83; 307/221 C

[56] References Cited

U.S. PATENT DOCUMENTS

| | | | |
|---|---|---|---|
| 3,623,075 | 11/1971 | Bench et al. | 329/104 X |
| 3,925,686 | 12/1975 | Nomiya | 307/221 C X |
| 3,997,847 | 12/1976 | Tong | 329/105 |
| 4,034,301 | 7/1977 | Kashio | 307/221 C X |
| 4,059,806 | 11/1977 | Vagt, Jr. | 329/50 X |
| 4,115,738 | 9/1978 | Mitarai et al. | 329/105 |

OTHER PUBLICATIONS

Schulenburg, "Einfache Fernsteuerung für 9 Kanäle", Elektronik 1975, vol. 10, pp. 104–105.

Primary Examiner—Siegfried H. Grimm
Assistant Examiner—Edward P. Westin
Attorney, Agent, or Firm—Hill, Van Santen, Steadman & Simpson

[57] ABSTRACT

In a demodulator the signal to be demodulated is applied to the information inputs of a shift register by way of a circuit, for example an RS flip-flop, which extends the signal duration and makes it possible to scan the signal with the shift register. The signal outputs of the shift register control two signal inputs of a second flip-flop by way of logic gates. The circuits required for constructing the demodulator can all be provided, without difficulty, in monolithic semiconductor technology and can be integrated with other circuits on a common semiconductor chip.

6 Claims, 2 Drawing Figures

INTEGRABLE DEMODULATOR FOR DIGITAL SIGNALS MODULATED ONTO CARRIERS

BACKGROUND OF THE INVENTION

1. Field of the Invention

The present invention relates to an integrable demodulator having a clock-controlled shift register for digital signals modulated onto carriers.

2. Description of the Prior Art

A digital demodulator is described, for example, in "Elektronik" 1975, Vol. 10, pp. 104–105, in which a decade counter with decoded outputs is loaded on its input side by means of the signal to be demodulated by way of parallel connection of a diode and an ohmic resistance, whereby a loading capacitance is provided between the signal input of the decade counter and ground. The outputs of the decade counter employed as a decoder feed the signal already demodulated in the diode-resistance-capacitance combination.

Such a demodulator circuit has the disadvantage of time-dependent charging and discharging curves, as well as a strong influence on the threshold values of a preamplifier given weak input signals. Moreover, it easily leads to distortions of the demodulated signal. In addition, it is extremely difficult to provide in monolithic semiconductor technology.

More specifically, such demodulators which are characterized by an externally pre-connected diode or, respectively, resistance and capacitance wiring, not only offer significant resistance against attempts for monolithic integration in MOS technology, but also lead to time-dependent discharging and charging curves which are conditioned by the capacitance provided at the input. As mentioned above, the discharge time constant leads to distortions of the demodulated signal. Also, a strong influence on the threshold values of the preamplifier given weak input signals as well as the danger of a mutilation of the code because of signal intrusions are considered as further disadvantages. Finally, a dimensioning of the resistance-capacitance combination at the input of the known demodulators represents a forced compromise between the integration time constant which should be large to prevent interference intrusions and the discharge time which should be small for small pulse distortions.

SUMMARY OF THE INVENTION

The object of the present invention, therefore, is to provide a remedy which allows the diode-capacitance circuit provided in the known arrangement to be omitted and thus offer the opportunity for suppressing the disadvantages connected with these elements.

A demodulator constructed in accordance with the present invention is designed in such a manner that the input to be demodulated is applied to the signal input of a shift register which is provided with a plurality of various signal outputs, by way of a circuit which extends the signal duration and renders possible a scanning by the shift register. A bistable flip-flop is connected to the output of the shift register for forming the output for the demodulator signal and is loaded at its two signal inputs by the logical output of a respective logic gate whose logic inputs are each respectively connected to a circuit output of the shift register.

A device extending the signal to be demodulated, which is particularly suited for the input of the demodulator set forth immediately above, is formed by a clock-controlled bistable flip-flop, which is designed in particular as an RS flip-flop. The bistable flip-flop provided at the output of the demodulator is also advantageously designed as an RS flip-flop. The shift register has the task of scanning the extended signal delivered from the input circuit, i.e. particularly from an RS flip-flop, and relaying the information thereby gathered to the output flip-flop. The logic gates connected between the flip-flop at the output of the demodulator and the shift register are essential for the creation of a distortion-free output signal, the data outputs of the logic gates being connected to the set input or, respectively, the reset input of the output flip-flop.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
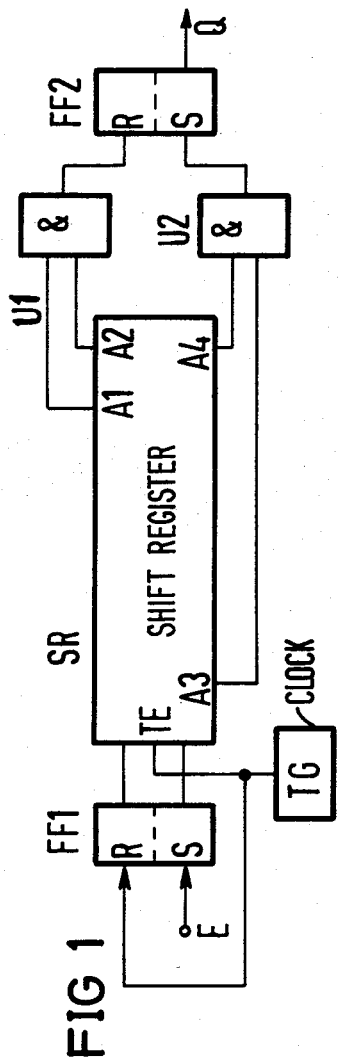
FIG. 1 is a schematic representation of a demodulator constructed in accordance with the present invention.

In the system illustrated in FIG. 1, the signal to be demodulated arrives from a signal input E to a clock-controlled circuit element FF1 which is constructed in such a manner that it extends the signal duration. As pointed out above, this function is advantageously performed by a flip-flop, particularly an RS flip-flop. In the case of an embodiment of the invention constructed in accordance with FIG. 1, the input flip-flop FF1 is symmetrically designed. Therefore, it has two signal outputs which are applied to a respective signal input of the shift register SR which may be of conventional construction. The shift register SR may consist of a chain of successively connected, identical flip-flop cells each having two signal inputs and corresponding signal outputs which are connected in succession, in a known manner for digital counters. Moreover, the flip-flop cells of the shift register SR are designed in such a manner that they exhibit a clock pulse input, which is true, for example, of two memory flip-flops.

In addition to the output provided by the output of the last flip-flop cell of the shift register SR, the internal construction of such a shift register also permits taps along the shift register so that variously connected signal outputs of the shift register SR are available which serve for inputs of the logic gates (next to the output of the last flip-flop cell of the shift register SR) provided between the shift register SR and the output flip-flop FF2.

The shift register can also be recognized with a different construction, that is with circuits other than flip-flops, such as bucket brigard device (BBD) circuits, or charge coupled device (CCD) circuits.

In the exemplary embodiment illustrated in FIG. 1, the demodulator input is formed by a symmetrical RS flip-flop FF1 whose signal input S, the set input, has the signal to be demodulated applied thereto and whose reset input R has reset pulses applied thereto which are periodically generated and supplied by a clock TG.

Further, clock pulse signals are required for the operation of the shift register SR which are advantageously synchronized with the reset pulses for the input flip-flop FF1, so that the use of the common clock pulse generator TG is recommended which supplies the input flip-flop with clock pulses at the reset input R and supplies the shift register SR with clock pulses at the clock pulse input TE.

In the embodiment illustrated in FIG. 1, the shift register SR exhibits four different outputs A1, A2, A3 and A4, which serve in pairs for applying logic input signals to the inputs of two AND gates U1 and U2. The output of one of the AND gates, the AND gate U1, is connected to the reset input R of the flip-flop FF2, while the output of the second AND gate U2 is connected to the set input S of the output flip-flop FF2. The output Q of the flip-flop FF2 on the set side of the flip-flop provides the demodulated signal.

The input signal to be demodulated is therefore applied at the set input S of the flip-flop FF1 which is periodically reset, so that a signal is available at the output of the flip-flop FF1 whose pulses are extended in contrast to the input signal. This signal is scanned between the reset pulses and transferred to the shift register SR. Depending on the length of the shift register SR, i.e. depending on the plurality of memory cells connected in series therein, a temporally determined portion of the above-mentioned input signal is respectively available within the shift register SR, which portion can be tapped by means of correspondingly arranged outputs at the shift register SR. The demodulated signal available at the end of the shift register is complete, and can be extended by a shift pulse period.

By employing the output flip-flop FF2, the delivery of the demodulated signal can be made to depend on the minimum duration of the input signal or, respectively, on a minimum plurality of input pulses. Thereby, a certain interference suppression can be achieved. The temporal forward advance of the reset pulse for the output flip-flop FF2 is made possible by the shift register SR, and is at least cocontrolled by the shift register SR on the basis of the proposed circuit, and allows a truncation of the demodulated signal and, therefore, a correction of the extension occasioned by the input flip-flop FF1. A remaining error would only be caused by the asynchronism between the input signal and the shift pulse.

The advantages of the embodiment of a digital demodulator illustrated in FIG. 1 are low distortion, discretionary interference suppression and adjustable time-offset between input and output signals.

The construction of the demodulator is possible both in bipolar semiconductor technology and in metal-oxide-semiconductor (MOS) technology. An altered example of MOS field effect transistors will be described with reference to FIG. 2. This embodiment differs from the construction of FIG. 1 by means of an asymmetric construction with respect to the flip-flops FF1 and FF2 as well as the logic gates controlled by the shift register SR and supplying the output flip-flop FF2 with signals.

Figure 2:
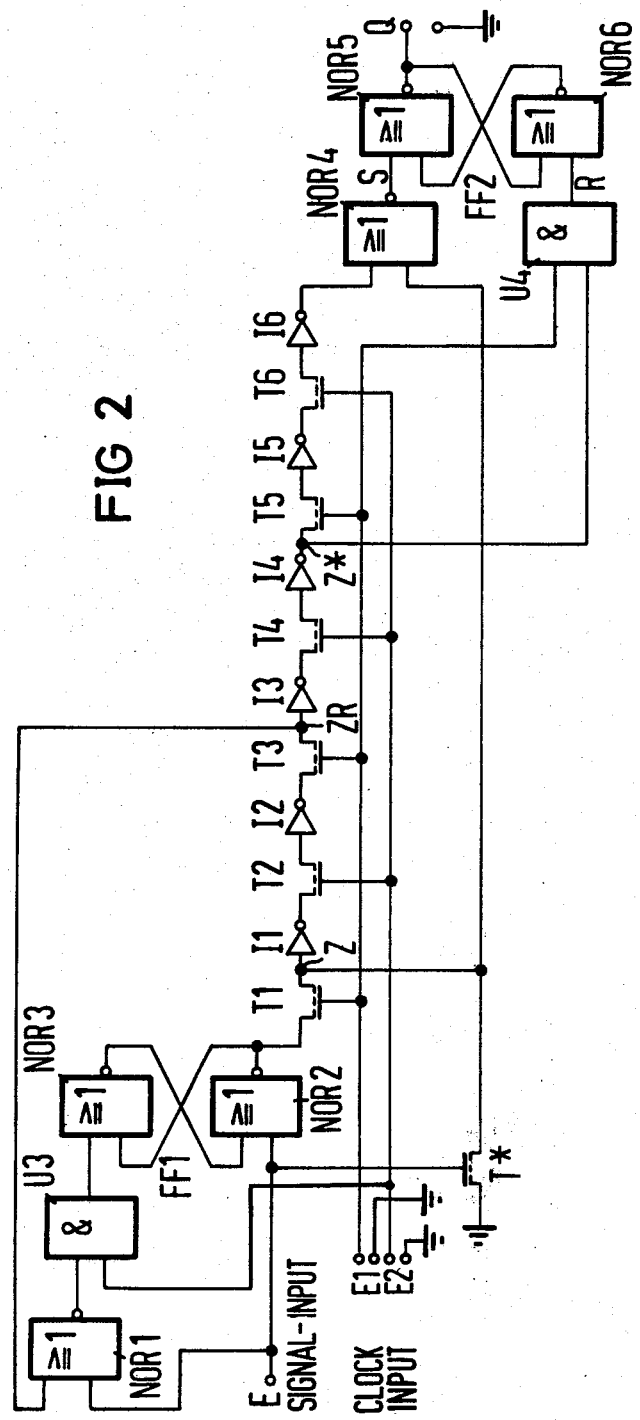
FIG. 2 is a schematic representation of another embodiment of a demodulator constructed in accordance with the present invention.

In FIG. 2, the basic control portions of the two flip-flops FF1 and FF2 can be realized in the usual manner either by means of cross-coupled NAND gates or cross-coupled NOR gates. In the exemplary embodiment illustrated in FIG. 2, the second alternative has been selected. Accordingly, the basic control of the input flip-flop FF1 consists of cross-coupled NOR gates NOR2 and NOR3, and the basic control of the output flip-flop FF2 consists of cross-coupled NOR gates NOR5 and NOR6. On the other hand, the circuit components serving the pulse supply and the signal supply of the flip-flops FF1 and FF2 are variously selected and include AND gates and NOR gates.

The shift register SR comprises a plurality n, in this example n=6, of memory cells connected in chain-like succession, each of the cells respectively comprising a clock-controlled field effect transistor $T_\gamma(\gamma=1, 2, \ldots n)$ and a respective post-connected inverter $I_\gamma$. At the same time, the field effect transistors, and above all also at the input of the shift register SR, serve as transfer stages. The inverters $I_{65}$ are likewise composed of MOS field effect transistors and are constructed in a well known manner (for example, of the series connection of an enhancement transistor with a signal-controlled gate and a second field effect transistor, for example, of the depletion type, connected as a load).

As is illustrated in FIG. 2, outputs of the shift register SR can be provided both by means of the inverter output of the individual memory cells of the shift register SR, as well as between the transfer transistor and the inverter within the individual memory cell or shift register stage.

The two cross-coupled NOR gates NOR2 and NOR3 of the input flip-flop FF1 each exhibit a free logic input. The free logic input of the NOR gate NOR2 is connected to the input E for receiving the signal to be demodulated, while the free logic input of the gate NOR3 is connected to the output of an AND gate U3 whose one data input is connected to a clock input E2 and whose other data input is connected to the output of a further NOR gate NOR1.

The one logic input of the NOR gate NOR1 is connected to the input E for receiving the signal to be demodulated, while the second logic input of the gate NOR1 is connected to a circuit point ZR of the shift register SR, so that a feedback of the shift register SR is achieved in this manner.

In the example illustrated in FIG. 2, the feedback point ZR of the shift register SR is between the transfer transistor T3 and the inverter I3 of the third register stage. In conjunction with the gates NOR1 and U3, the reverse coupling just-described allows a time-delayed release of the periodic reset pulses for the input flip-flop FF1, so that, with an asynchronously occurring signal, the input flip-flop FF1 is already set by means of the first carrier pulse, which would not be guaranteed with certainty in the case of periodically enduring reset pulses upon incidental temporal coincidence. With this structure it is also guaranteed that a remaining error can only arise because of the asynchronism between the input signal and pulse.

The output of the input flip-flop FF1 is provided by the logic output of the NOR gate NOR2 which is directly connected to the input signal at the terminal E, via which the extended input signal arrives at the input transistor T1 of the first stage of the shift register SR. A branching location Z is located between the input transistor T1 and the following inverter I1, which branching location at the same time forms an output of the shift register SR leading to the NOR gate NOR4 which is post-connected to the shift register SR and provided in place of the AND gate U1 in FIG. 1. The second logic input of the NOR gate NOR4 is connected to the output of the last memory cell of the shift register SR, therefore in the present example to the signal output of the inverter I6. The output of the NOR gate NOR 4 serves for the control of the set input S of the output flip-flop FF2, i.e. of the free logic input of the gate NOR5 at whose output Q the demodulated signal appears.

The free logic input of the gate NOR6, i.e. of the reset input R of the output flip-flop FF2, is controlled by the logic output of an AND gate U4, which corresponds to the gate U2 in FIG. 1 and whose two logic inputs are connected in such a manner that one receives the clock input of the demodulator from the input terminal E1 and the other input is connected to a circuit point Z* between two successive memory cells, i.e. register stages of the shift register SR (in the example, between the fourth and fifth register stages). A truncation of the demodulated signal and therefore a correction of an extension occasioned by the input flip-flop FF1 is achieved.

The input E for the signal to be demodulated is connected not only to the two NOR gates NOR1 and NOR2, but also to the gate of a field effect transistor T* whose source is connected to ground and whose drain is connected to a branching point Z between the first transfer transistor T1 and the first inverter I1 of the shift register and, therefore, also to one of the one logic input of the NOR gate NOR4. The transfer transistor T* and the circuit described in connection with FIG. 2 effect that the information of a signal modulated onto carriers present at the input E is immediately transferred into the shift register SR even at times at which the transfer transistor is not receiving a clock pulse (i.e. is blocked). In this case, the storage capacity of the capacitance of the transistor in the inverter I1 is exploited in order to achieve the extension mentioned above of the signal to be delivered to the shift register SR.

Both the signal to be demodulated at the input E and the clock signals delivered to the clock inputs E1 and E2 are referenced to a specified level, to ground.

The reset pulses for the input flip-flop FF1 are triggered by the clock signals developed at the input E2, which clock pulses at the same time serve for the clock supply of the shift register SR. For this reason, the gate electrodes of those transfer transistors $T_\gamma$ which belong to memory cells having an even-numbered numbering of the number $\gamma$ are connected to the input E2. The gate electrodes of those transfer transistors $T_\gamma$ which belong to memory cells having uneven $\gamma$ numbers, however, are connected to the clock input E1 which is also provided for the one logic input of the AND gate U4 which is connected ahead of the output flip-flop FF2.

It should be mentioned that the signals provided at the two clock inputs E1 and E2 of the shift register SR are selected in such a manner that they are periodic, that they are in stationary phase with respect to one another, and that their working levels do not overlap.

The embodiment of the demodulator illustrated in FIG. 2 has been completely described. In contrast to the embodiment illustrated in FIG. 1, the embodiment of FIG. 2 exhibits the advantage that it is a matter of solution that meets with the conditions of MOS technology and is integrable on a silicon chip without problems in a space-saving manner.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A demodulator comprising:
   a demodulator input for receiving a signal to be demodulated;
   a shift register including an input, an output, a plurality of output taps and a plurality of serially-connected memory cells, the first memory cell of the series connected to said shift register input and the last memory cell of the series connected to said shift register output,
   each of said memory cells including a field effect transistor having a gate and a source-drain path, and an inverter connected in series with said source-drain path;
   a first clock input and a first clock line connected thereto for receiving cyclically occurring first clock pulses, said gates of the odd-numbered transistors of the series connected to said first clock line;
   a second clock input and a second clock line connected thereto for receiving cyclically occurring second clock pulses which are phased and separated in time with respect to said first clock pulses, said gates of the even-numbered transistors of the series connected to said second clock line;
   first and second NOR gates interconnected as an RS flip-flop and including an output connected to said shift register input, a set input and a reset input;
   a first AND gate including an output connected to said reset input, a first input connected to said second clock line, and a second input;
   a third NOR gate including an output connected to said second input of said AND gate, a first input connected to said demodulator input for receiving a signal to be demodulated, and a second input connected as a feedback input to a first of said output taps of said shift register;
   a fourth NOR gate including a first input connected to said output of said shift register, a second input connected to a second of said output taps of said shift register, and an output;
   a second AND gate including a first input connected to said first clock line, a second input connected to a third of said output taps of said shift register, and an output; and
   fifth and sixth NOR gates interconnected as an RS flip-flop including an output constituting the output of the demodulator, a set input connected to said output of said fourth NOR gate, and a second input connected to said output of said second AND gate.

2. The demodulator of claim 1, constructed as a metal-oxide-semiconductor structure.

3. A demodulator comprising:
   a demodulator input for receiving a signal to be demodulated;
   a shift register including an input, an output, a plurality of output taps and a plurality of serially-connected memory cells, the first memory cell of the series connected to said shift register input and the last memory cell of the series connected to said shift register output,
   each of said memory cells including a field effect transistor having a gate and a source-drain path, and an inverter connected in series with said source-drain path;

a first clock input and a first clock line connected thereto for receiving cyclically occurring first clock pulses, said gates of the odd-numbered transistors of the series connected to said first clock line;

a second clock input and a second clock line connected thereto for receiving cyclically occurring second clock pulses which are phased and separated in time with respect to said first clock pulses, said gates of the even-numbered transistors of the series connected to said second clock line;

first and second NAND gates interconnected as an RS flip-flop and including an output connected to said shift register input, a set input and a reset input;

a first AND gate including an output connected to said reset input, a first input connected to said second clock line, and a second input;

a first NOR gate including an output connected to said second input of said first AND gate, a first input connected to said demodulator input for receiving a signal to be demodulated, and a second input connected as a feedback input to a first of said output taps of said shift register;

a second NOR gate including a first input connected to said output of said shift register, a second input connected to a second of said output taps of said shift register, and an output;

a second AND gate including a first input connected to said first clock line, a second input connected to a third of said output taps of said shift register, and an output; and third and fourth NAND gates interconnected as an RS flip-flop including an output constituting the output of the demodulator, a set input connected to said output of said second NOR gate, and a second input connected to said output of said second AND gate.

4. The demodulator of claim 3, constructed as a metal-oxide-semiconductor structure.

5. A demodulator for digital signals modulated onto a carrier as input signals, comprising:

a shift register including a signal input, a clock input and a plurality of outputs;

a clock connected to said clock input and operable to produce clock pulses;

input signal means including a signal receiving input for receiving the modulated digital signals, an output connected to said signal input of said shift register, a bistable flip-flop connected to said clock and to said signal receiving input and controlled by the clock pulses and the modulated digital signals and including a signal output constituting said output of said input signal means, and gating means including a first input connected to said signal receiving input, an output connected to said signal input of said shift register and a second input connected to one of said outputs of said shift register for asynchronous clocking of asynchronously-received input signals;

said input signal means operable to extend the duration of an input signal for said shift register for scanning the input signal in response to said clock pulses;

a flip-flop output circuit; and logic means connected to said plurality of outputs of said shift register and to said flip-flop output circuit for combining the signals of said plurality of outputs and operating said flip-flop output circuit.

6. A demodulator for digital signals modulated onto a carrier as input signals, comprising:

a shift register including a signal input, a clock input and a plurality of outputs;

a clock connected to said clock input and operable to produce clock pulses;

input signal means including a signal receiving input for receiving the modulated digital signals, an output connected to said signal input of said shift register, a bistable flip-flop connected to said clock and to said signal receiving input and controlled by the clock pulses and the modulated digital signals and including a signal output constituting said output of said input signal means, and gating means including a first input connected to said signal receiving input, an output connected to said signal input of said shift register and a second input connected to one of said outputs of said shift register for asynchronous clocking of asynchronously-received input signals;

said input signal means operable to extend the duration of an input signal for said shift register for scanning the input signal in response to said clock pulses;

a flip-flop output circuit; and logic means connected to said plurality of outputs of said shift register and to said flip-flop output circuit for combining the signals of said plurality of outputs and operating said flip-flop output circuit, wherein said shift register comprises a plurality of serially-connected memory stages, each of said stages including a field effect transistor having a gate and a source-drain path, and an inverter connected to said source-drain path, said transistors being alternately odd-numbered and even-numbered in said serially-connected memory stages, wherein said clock provides first and second clock pulse trains with the clock pulses of each train being cyclical and not overlapping with the clock pulses of the other clock pulse train, said gates of the odd-numbered transistors connected to receive said first clock pulses and said gates of the even-numbered transistors connected to receive said second clock pulses, selected ones of said inverters including outputs which constitute said outputs of said shift register, said shift register comprising an additional field effect transistor including a gate connected to said signal input and a source-drain path connected to said inverter of the first memory stage of said shift register, and further comprising an output RS flip-flop, said logic means, together with the output RS flip-flop which constitutes the flip-flop output circuit, comprising first and second NOR gates interconnected as said RS flip-flop having a set input, a reset input and an output, a third NOR gate having an output connected to said set input, a first input connected to the inverter of the last stage of said shift register, and a second input connected to the junction of the transistor and the inverter of the first stage of said shift register, and an AND gate having an output connected to said reset input, a first input connected in common with said gates of said odd-numbered transistors and a second input connected to a predetermined one of said memory stages.

* * * * *